United States Patent
Kwon et al.

(10) Patent No.: US 8,088,015 B2
(45) Date of Patent: Jan. 3, 2012

(54) SELF-REPAIRING BOOT FOR A CONSTANT VELOCITY JOINT

(75) Inventors: Edward Kwon, Rochester, MI (US); Ramon Kuczera, Clarkston, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 364 days.

(21) Appl. No.: 12/261,701

(22) Filed: Oct. 30, 2008

(65) Prior Publication Data

US 2009/0115142 A1    May 7, 2009

Related U.S. Application Data

(60) Provisional application No. 60/984,554, filed on Nov. 1, 2007.

(51) Int. Cl.
*F16D 3/84* (2006.01)
(52) U.S. Cl. ............... 464/173; 464/906
(58) Field of Classification Search .......... 464/173–175, 464/906; 403/50, 51; 277/650, 654, 634–636; 138/118, 121, 137; 74/18; 428/36.9, 36.91
See application file for complete search history.

(56) References Cited

U.S. PATENT DOCUMENTS

| | | | | |
|---|---|---|---|---|
| 4,967,609 | A * | 11/1990 | Takagi et al. | 464/175 |
| 6,085,797 | A * | 7/2000 | Grabaum et al. | 138/121 |
| 6,386,551 | B1 * | 5/2002 | Martin | 277/634 |
| 6,518,330 | B2 * | 2/2003 | White et al. | |
| 6,576,312 | B1 * | 6/2003 | Ito et al. | 138/137 |
| 6,858,660 | B1 * | 2/2005 | Scheifers et al. | |
| 6,942,223 | B2 | 9/2005 | Wang | |
| 7,108,914 | B2 * | 9/2006 | Skipor et al. | |
| 7,566,747 | B2 * | 7/2009 | Moore et al. | |
| 7,569,625 | B2 * | 8/2009 | Keller et al. | |
| 7,612,152 | B2 * | 11/2009 | Braun et al. | |
| 2005/0051972 | A1 * | 3/2005 | Wang | 277/634 |
| 2009/0105421 | A1 * | 4/2009 | Takeishi et al. | 277/634 |

OTHER PUBLICATIONS

Chen, X. et al. A thermally re-mendable cross-linked polymeric material. Science 295, 1698-1702 (2002).*
Kessler, M. R., Sottos, N. R. & White, S. R. Self-healing structural composite materials. Compos. Part. A 34, 743-753 (2003).*
Nagaya, K., Ikai, S., Chiba, M. & Chao, X. Tire with self-repairing mechanism. JSME Int. J. 49, 379-384 (2006).*
White, S. R. et al. Autonomic healing of polymer composites. Nature 409, 794-797 (2001).*
Bleay, et al. A smart repair system for polymer matrix composites. Composites: Part A 32, p. 1767-1776 (2001).*
Hayes, et al. A self-healing thermosetting composite material. Composites: Part A 38, p. 1116-1120 (2007).*
Hayes, et al. Self-healing of damage in fibre-reinforced polymer-matrix composites. Interface 4, p. 381-387 (2007).*
Kessler, et al. Self-healing structural composite materials. Composites: Part A 34, p. 743-753 (2003).*
"Self-healing materials with microvascular networks" by Kathleen S. Toohey, Nancy R. Sottos, Jennifer A. Lewis, Jeffrey S. Moore, and Scott R. White; publlished Jun. 10, 2007; Nature Publishing Group.

* cited by examiner

*Primary Examiner* — Gregory Binda
*Assistant Examiner* — Josh Skroupa
(74) *Attorney, Agent, or Firm* — Jennifer M. Brumbaugh; Mick A. Nylander; Rader, Fishman & Grauer PLLC

(57) ABSTRACT

A boot assembly for an articulating joint is provided, including an inner layer and an outermost layer. The inner layer is constructed from a first material and the outermost layer is constructed from a second material that is different from the first material. The outermost layer at least partially covers the inner layer, and the second material includes a self-repairing polymer.

19 Claims, 3 Drawing Sheets

SELF-REPAIRING BOOT FOR A CONSTANT VELOCITY JOINT

CROSS REFERENCE TO RELATED APPLICATIONS

This application is a non-provisional application claiming priority to U.S. Ser. No. 60/984,554 filed on Nov. 1, 2007, which application is incorporated herein in its entirety.

TECHNICAL FIELD

The present disclosure relates to boot cover assemblies, and in particular to a boot assembly constructed from at least two different materials.

BACKGROUND

Universal joints, and especially constant velocity joints, operate to transmit torque between two rotational members. The rotational members are typically interconnected by a cage, or yoke, that allows the rotational members to operate with their respective axes at a relative angle. Constant velocity joints and similar rotating couplings typically include a boot cover assembly to enclose and protect the coupling during operation. The boot cover assembly is partially flexible and therefore able to seal around the joint while permitting articulation and relative axial movement of the joint. The boot cover assembly seals lubricant in the joint so as to reduce friction and extend the life of the joint. The boot cover assembly also seals out dirt, water and other contaminants to protect the functionality of the joint. However, leaks in the boot cover assembly may reduce the life of the joint, and contaminants in the grease may disturb the chemical composition of the grease, degrading its performance.

Indeed, a significant portion of constant velocity joint failures are due to damage to the boot. The boot is usually ruptured or cracked by impact with debris from the outside, such as stones or sticks. Alternatively, the boot sometimes cracks due to fatigue caused by the high stresses that are placed on the boot material when the joint is operated at high angles. If the boot cracks or ruptures, the lubricant located inside the joint will leak out, and cause corrosion or failure of the joint.

DETAILED DESCRIPTION

Exemplary illustrations are described below. In the interest of clarity, not all features of an actual implementation are described in this specification. It will of course be appreciated that in the development of any such actual illustration, numerous implementation-specific decisions must be made to achieve the developers' specific goals, such as compliance with system-related and business-related constraints that will vary from one implementation to another. Moreover, it will be appreciated that such a development effort might be complex and time-consuming, but would nevertheless be a routine undertaking for those of ordinary skill in the art having the benefit of this disclosure.

According to various exemplary illustrations described herein, a boot assembly for an articulating joint is provided, including an inner layer and an outermost layer. The inner layer is constructed from a first material. The outermost layer is constructed from a second material that is different from the first material, wherein the second material comprises a self-repairing polymer. The outermost layer at least partially covers the inner layer.

Figure 1A:
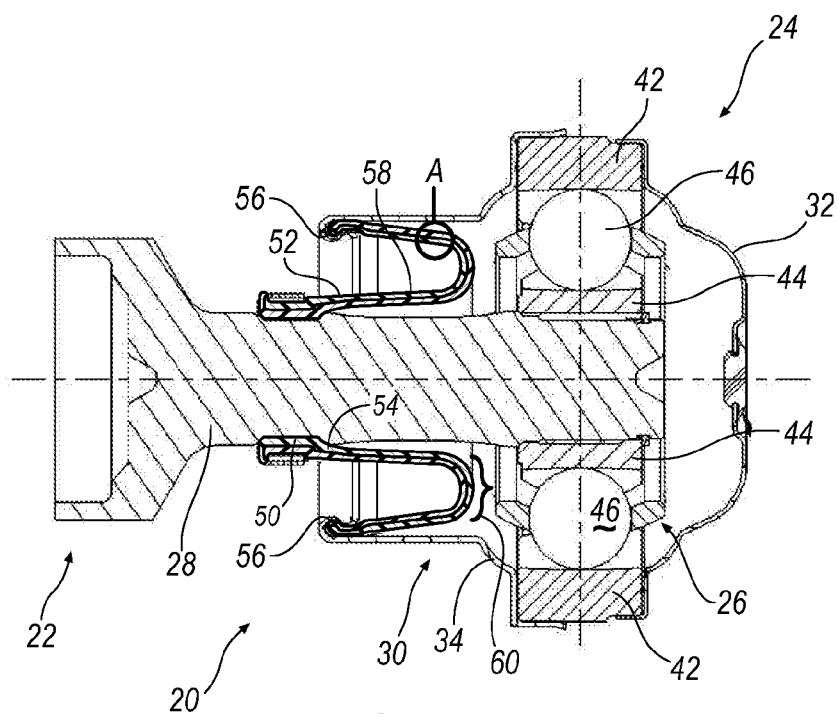
FIG. 1A is a partial cross sectional view of a joint including a joint assembly and a boot assembly.

Turning now to the illustrations, FIG. 1A illustrates a joint 20 having a driven end 22 and a driving end 24, however, it should be noted that the driven end 22 can also be the driving end, and the driving end 24 can also be the driven end. The joint 20 further includes a joint assembly 26 that is coupled to a shaft 28. A boot assembly 30 is connected between the joint assembly 26 and the shaft 28. A grease cover 32 seals the driven end 22 of the joint 20. The joint assembly 26 includes an outer race 42, an inner race 44, and a plurality of balls 46. The boot assembly 30 serves to protect the moving parts of the joint 20. As illustrated, the shaft 28 is splined to the inner race 44. It should be noted that while FIG. 1A illustrates the joint assembly 26 as a constant velocity joint, any type of articulated universal joint, such as, but not limited to, a plunging tripod, a fixed tripod, a plunging ball joint and a fixed ball joint may be used.

The boot assembly 30 includes a contoured body of revolution having a small end 54, a large end 56, a middle portion 58, and a curved portion 60. As illustrated in FIG. 1A, the small end 54 is coupled to the shaft 28 and the large end 56 is connected to a metal cover 34 which is coupled to the outer race 42. In one example, the small end 54 may be coupled to the shaft 28 with a conventional hose clamp. Further, in one example, the large end 56 is crimped to metal cover 34.

In the illustration as shown in FIG. 1A, the boot assembly 30 is a roll boot that includes at least two different layers, which are an inner layer 50 and an outermost layer 52. The inner layer 50 is constructed from a first material 54 and the outermost layer 52 is constructed from a second material 56. The first material 54 is different from the second material 56. That is, the second material 56 a self-repairing polymer. The first material 54 is any grease compatible material, such as, but not limited to, hydrogenated nitrile butadiene rubber (HNBR).

The outermost layer 52 acts as a shield to the inner layer 50, protecting the inner layer 50 from cracks in the boot assembly 30 that are caused by debris or fatigue, as discussed in greater detail below. Moreover, because the inner layer 50 is constructed from a grease compatible material 54, the inner layer 50 protects the outermost layer 52 from contact with lubricants from the joint 20. Therefore, the self-healing polymer 56 is not required to be grease compatible, as the inner layer 50 shields the outermost layer 52. FIG. 1A illustrates the inner layer 50 in complete contact with the outermost layer 52. It should be noted that while FIG. 1A illustrates the inner layer 50 completely covered by the outermost layer 52, only a portion of the inner layer 50 may be in contact with a portion of the outermost layer 52. In one example, an intermediate layer (not shown) may be placed between the inner layer 50 and the outermost layer 52.

Figure 1B:
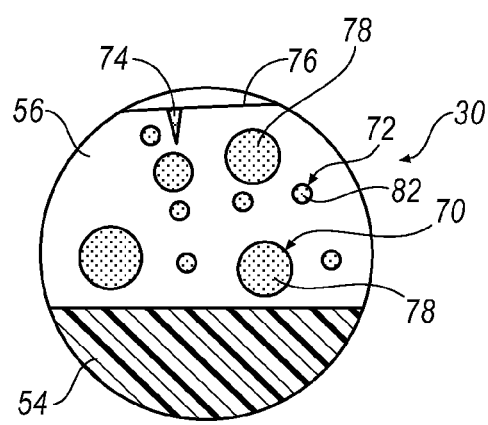
FIG. 1B is an enlarged view of Region A in FIG. 1A, including a crack in an outermost layer of the boot.
Figure 1C:
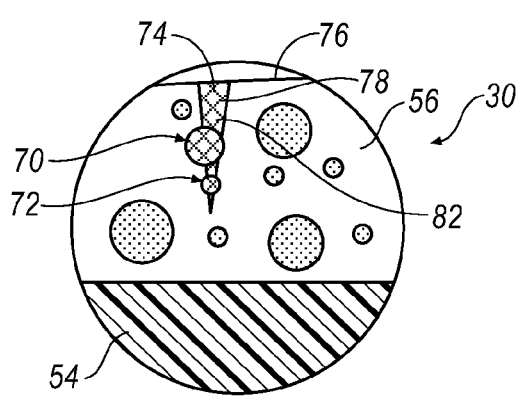
FIG. 1C is an enlarged view of Region A in FIG. 1A after the crack has been self-repaired.

FIG. 1B is a magnified view of a portion of the first material 54 and the second material 56. The second material 56 that is a self-repairing polymer includes a plurality of microcapsules 70 as well as a plurality of catalyst spheres 72. The microcapsules 70 include a healing agent 78, and the catalyst spheres 72 contain a catalyst 82 that triggers polymerization when mixed with the healing agent. A crack 74 is shown propagating at an outer surface 76 of the boot assembly 30 in FIG. 1B. As seen in FIG. 1C, when the crack 74 grows and travels beyond the outer surface 76, the microcapsules 70 and the catalyst spheres 72 rupture, thereby releasing the healing agent 78 as well as the catalyst 82. When released, the healing agent 78 mixes with the catalyst 82 and results in polymerization that will bond the crack 74 together.

In one illustration, the self-repairing polymer's healing properties can be activated at elevated temperatures of about 120° F. (49° C.). Such a heat-activated property can be advantageous, because the boot assembly 30 is located on the underside of a motor vehicle, and is usually in close proximity with an exhaust system of the vehicle (not shown). The joint assembly 26 also generates heat as well. Thus, when the boot assembly 30 is subjected to elevated temperatures the mending of the self-repairing polymer is triggered.

The crack 74 is formed when the boot assembly 30 is subjected to debris or fatigue caused by high stresses placed when the joint 20 is operated at high angles. Because the outermost layer 52 is constructed from a self-repairing polymer, any of the cracks 74 will eventually self mend. Thus, the inner layer 50 is protected from outside elements, and any of the cracks 74 caused by debris and fatigue can only occur on the outermost layer 52.

Figure 2A:
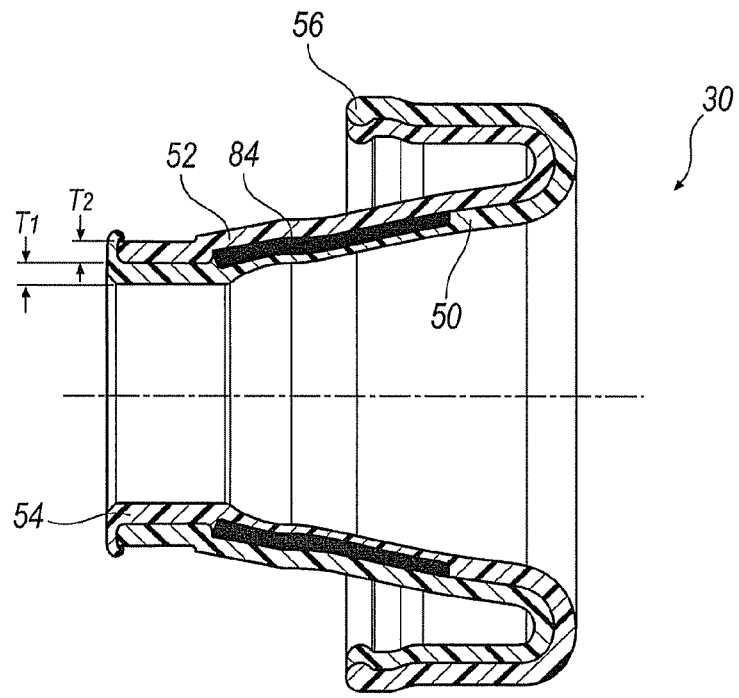
FIG. 2A is a partial cross sectional view of an embodiment of the boot of FIG. 1A.
Figure 2B:
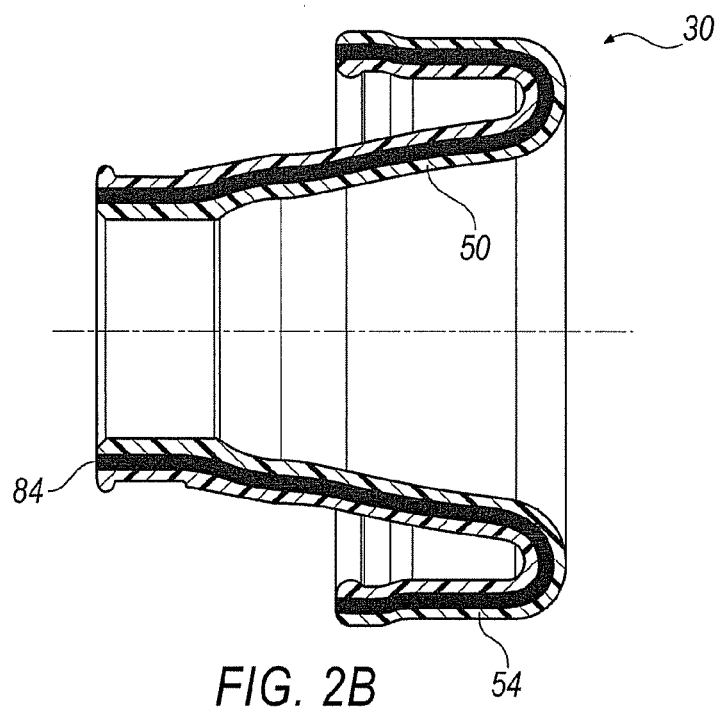
FIG. 2B is another partial cross sectional view of an embodiment of the boot of FIG. 1A.

FIG. 2A is a detailed section of the boot assembly 30. At least a portion of the inner layer 50 and at least a portion of the outermost layer 52 are bonded together at a bonding region 84. The bonding region 84 is any interface which is able to attach the inner layer 50 to the outermost layer 52. In one example, the bonding region 84 can be a glue interface. Alternatively, the bonding region may also be a bonded interface. In the embodiment shown in FIG. 2A, then bonding region 84 extends only on a portion of the inner and outermost layers 50 and 52. Alternatively, the bonding region 84 may extend along the entire length of the inner and outermost layers 50 and 52, as shown in FIG. 2B.

In the illustration as shown, the boot assembly 30 includes both of the inner layer 50 and the outermost layer 52, including a generally uniform thickness. The inner layer 50 includes an inner thickness T1 and the outermost layer 52 includes an outer thickness T2. However, it should be noted that both of the inner layer 50 and the outermost layer 52 may not have a uniform thickness as well.

FIG. 2A illustrates the inner thickness T1 equal to the outer thickness T2. Although FIG. 2A illustrates both the inner layer 50 and the outer layer 52 having the same thickness, each of the layers 50 and 52 may also have different thicknesses as well. FIG. 2A illustrates the outermost layer 52 partially covering the inner layer 50. It should be noted that the outermost layer 52 may also completely cover the inner layer 50 as well.

Figure 3:
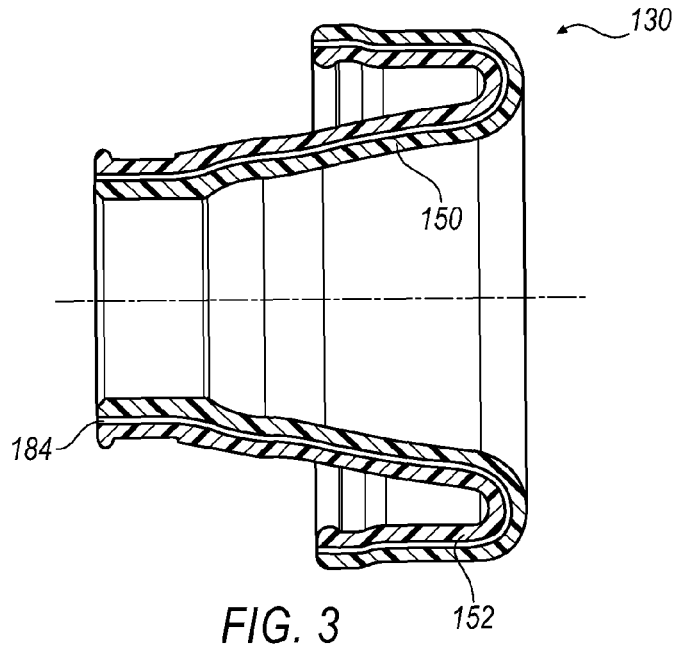
FIG. 3 is yet another alternative illustration of the boot of FIG. 1A

FIG. 3 is an alternative illustration of the boot assembly 130. In the illustration as shown, the boot assembly 130 includes an intermediate layer 184. The intermediate layer 184 is located between the inner layer 150 and the outermost layer 152, and in one example the intermediate layer 184 may actually be comprised of a plurality of layers.

Moreover, the intermediate layer 184 may also be interwoven between the inner layer 150 and the outermost layer 152. The intermediate layer 184 is configured for adding another layer of protection to the boot assembly 130. The intermediate layer 184 can be constructed from any material that is able to add an extra layer of protection to the boot assembly 130, such as, but not limited to, a woven plastic or a fabric material.

Figure 4A:
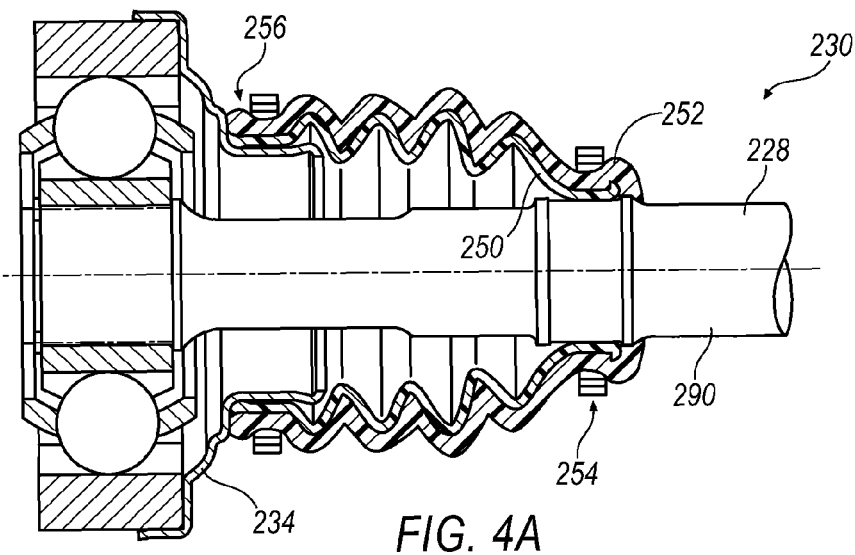
FIG. 4A is an alternative illustration of the joint and the boot.

FIG. 4A is yet another alternative illustration of the boot assembly 230 having a dual layer convoluted boot. Boot assembly 230 is also intended for an application such as a fixed joint, where an internal rolling diaphragm is not desired. The boot assembly 230 includes at least an inner layer 250 and an outermost layer 252. The boot assembly 230 also includes a small end 254 and a large end 256. In the exemplary embodiment shown, both the small end 254 and the large end 256 are clamped.

Figure 4B:
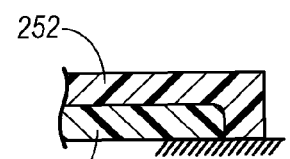
FIG. 4B is a partial cross sectional view of an end portion of the boot of FIG. 4A.

FIG. 4B is a magnified view of either the small end 254 or the large end 256. In the illustration as shown, the inner layer 250 is not exposed to the outside environment and is completely covered by the outermost layer 252. That is, the outermost layer 252 completely extends over the inner layer 250, and also contacts an outer surface 290 of the shaft 228 or the metal cover 234.

Figure 4C:
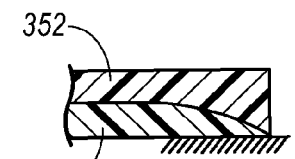
FIG. 4C is a partial cross sectional view of an alternative illustration of the end portion of the boot of FIG. 4A.
Figure 4D:
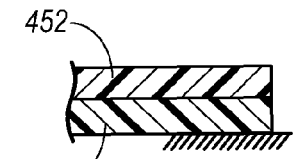
FIG. 4D is a partial cross sectional view of an alternative illustration of the end portion of the boot of FIG. 4A.

In an alternative illustration, as seen in FIG. 4C, either of the small end 254 or the large end 256, only the outermost layer 352 is exposed to the outside, and the inner layer 350 is only exposed to either the outer surface 290 of the shaft 228 or the metal cover 234. That is, the inner layer 350 is not exposed to the outside. FIG. 4D shows another alternative illustration of either the small end 254 or the large end 256. The inner layer 450 is exposed to the outside environment, but only at an edge where the boot 230 terminates, at either end thereof. In this arrangement, the outermost layer 452 is not exposed to either of the shaft 228 or the metal cover 234.

The present disclosure has been particularly shown and described with reference to the foregoing embodiments, which are merely illustrative of the best modes for carrying out the disclosure. It should be understood by those skilled in the art that various alternatives to the embodiments of the disclosure described herein may be employed in practicing the disclosure without departing from the spirit and scope of the disclosure as defined in the following claims. It is intended that the following claims define the scope of the disclosure and that the method and apparatus within the scope of these claims and their equivalents be covered thereby. This description of the disclosure should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A boot assembly for an articulating joint, comprising:
an inner layer constructed from a first flexible material; and
an outermost layer constructed from a second flexible material that is different from the first flexible material;
wherein the outermost layer at least partially covers the inner layer, and the second flexible material includes a self-repairing polymer, and wherein the self-repairing polymer of the outermost layer is heat activated when exposed to a predetermined elevated operational temperature, so as to trigger self-repairing of the outermost layer.

2. The boot assembly of claim 1, wherein the inner layer is in contact with at least a portion of the outermost layer.

3. The boot assembly of claim 1, wherein the outermost layer completely covers the inner layer.

4. The boot assembly of claim 1, wherein the first flexible material is a grease compatible material.

5. The boot assembly of claim 1, wherein the self-repairing polymer further comprises a plurality of healing agents configured as microcapsules and a plurality of catalyst spheres.

6. The boot assembly of claim 5, wherein the plurality of microcapsules and catalyst spheres are randomly dispersed in the second flexible material.

7. The boot assembly of claim 1, wherein the self-repairing polymer's predetermined temperature is approximately 120° F. so as to trigger self-repairing of the outermost layer.

8. The boot assembly of claim 1, wherein at least a portion of the inner layer and at least a portion of the outer layer are bonded together at a bonding region.

9. The boot assembly of claim 8, wherein the bonding region is one of a glue interface and a bonded interface.

10. The boot assembly of claim 1, further comprising at least one intermediate layer, the intermediate layer located between the inner layer and the outermost layer.

11. The boot assembly of claim 10, wherein the intermediate layer is one of a woven plastic and a fabric material.

12. The boot assembly of claim 10, wherein the intermediate layer is further comprised of a plurality of layers.

13. The boot assembly of claim 1, wherein the boot assembly is a boot cover that includes at least one end portion, and the inner layer is partially exposed at the end portion.

14. A boot assembly for an articulating joint, comprising:
   an inner layer constructed from a first flexible grease compatible material; and
   an outermost layer constructed from a second flexible material that is different from the first material, wherein the inner layer is in contact with at least a portion of the outermost layer;
   wherein the outermost layer at least partially covers the inner layer, and the second flexible material includes a self-repairing polymer, and wherein the self-repairing polymer is activated at an elevated operational temperature of approximately 120° F.

15. The boot assembly of claim 14, wherein the outermost layer completely covers the inner layer.

16. The boot assembly of claim 14, wherein the self-repairing polymer further comprises a plurality of healing agents configured as microcapsules and a plurality of catalyst spheres.

17. The boot assembly of claim 16, wherein the plurality of microcapsules and catalyst spheres are randomly dispersed in the second flexible material.

18. The boot assembly of claim 14, further comprising at least one intermediate layer, the intermediate layer located between the inner layer and the outermost layer.

19. The boot assembly of claim 18, wherein the intermediate layer is one of a woven plastic and a fabric material.

* * * * *